March 25, 1952  H. N. RIDER  2,590,347
PNEUMATICALLY ACTUATED VALVE CONTROLLING APPARATUS
Filed Jan. 25, 1946  4 Sheets-Sheet 3

Harry N. Rider.
INVENTOR.

BY W. B. Harpman

ATTORNEY.

March 25, 1952     H. N. RIDER     2,590,347
PNEUMATICALLY ACTUATED VALVE CONTROLLING APPARATUS
Filed Jan. 25, 1946     4 Sheets-Sheet 4

INVENTOR.
Harry N. Rider.
BY
ATTORNEY.

Patented Mar. 25, 1952

2,590,347

UNITED STATES PATENT OFFICE 2,590,347

PNEUMATICALLY ACTUATED VALVE CONTROLLING APPARATUS

Harry N. Rider, Youngstown, Ohio, assignor to "Automatic" Sprinkler Corporation of America, Youngstown, Ohio, a corporation of Delaware Application January 25, 1946, Serial No. 643,428

2 Claims. (Cl. 137—161)

This invention relates to means for controlling one or more fluid control valves such as employed in the handling and flow control of liquids such as petroleum and the like.

The principal object of the invention is the provision of pneumatically actuated apparatus for controlling fluid valves.

A further object of the invention is the provision of heat responsive means for effecting the operation of fluid control valves.

A still further object of the invention is the provision of pressure means for maintaining fluid control valves in preset open or closed position.

A still further object of the invention is the provision of pneumatically controlled, pressure actuated apparatus for opening or closing one or more pressure actuated fluid control valves.

The pneumatically actuated valve controlling apparatus shown and described herein has been devised to provide automatic fire initiated operation of one or more fluid control valves. The fluid control valves with which the pneumatically actuated valve controlling apparatus is employed are known in the art and are capable of being actuated by increase of or release of pressure in the actuating mechanism thereof. Such a valve comprises a body member defining a passageway therethrough and has a clapper mounted therein for closing said passageway. A hydraulic cylinder and piston assembly is mounted on the valve body member and the piston operatively connected to said clapper which is also spring urged to either open or closed position. Hydraulic pressure introduced into the hydraulic cylinder and piston assembly will overcome the spring action and open or close the clapper as the case may be. In the present disclosure these valves are normally spring urged toward closed position, the hydraulic pressure in the hydraulic cylinder and piston assembly holding the clappers open. The flow of material controlled by the valves also tends to close the clapper, as used in this disclosure. Such valves are known commercially as the Atwood-Morrell type. In the present disclosure a pair of these Atwood-Morrell type valves are diagrammatically illustrated as controlling a pair of fluid lines and the apparatus is disclosed in connection therewith and for operation thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
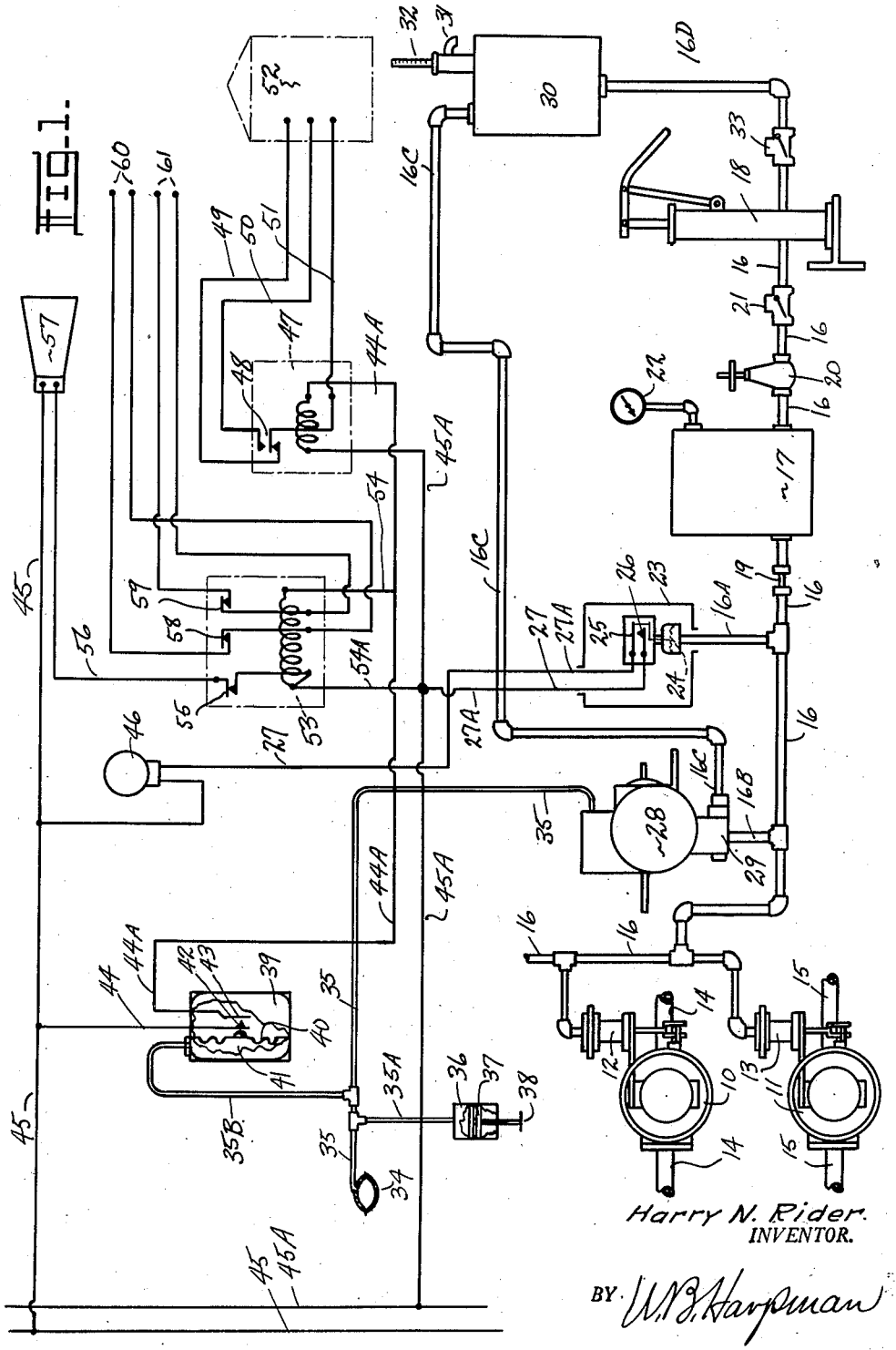
Figure 1 is a diagrammatic illustration of the pneumatically actuated valve controlling apparatus.

By referring to the drawings and Figure 1 in particular, it will be seen that the pneumatically actuated valve controlling apparatus has been illustrated in operative relation to a pair of pressure actuated fluid control valves 10 and 11, which valves are of the "Atwood-Morrell" type known in the art, and are adapted to be closed by loss of operating pressure in the actuating portions (hydraulic cylinder and piston assemblies) 12 and 13 thereof, respectively. These valves 10 and 11 are shown in position on and controlling fluid lines 14 and 15, respectively, such as are commonly employed in the handling of various petroleum products, etc., and hereinafter described.

In Figure 1 of the drawings, the actuating portions (hydraulic cylinder and piston assemblies) 12 and 13 of the fluid control valves 10 and 11 are shown connected by means of piping 16 with a reservoir 17 and a pump 18. A restricted section of the piping 16 is indicated by the numeral 19 and a control valve also in the piping 16 between the reservoir 17 and the pump 18 is indicated by the numeral 20. A check valve located in the piping 16 between the pump 18 and the interior valve 20 is indicated by the numeral 21. The check valve 21 permits free flow of fluid pressure from the pump 18 to the reservoir 17 but prevents flow in the other direction. The reservoir 17 is provided with a pressure gauge 22 and the piping 16 between the valve actuating portions 12 and 13, and the reservoir 17 is connected with a pressure responsive electrical switch 23 by means of a section of piping 16A.

The pressure responsive electrical switch 23 includes a diaphragm 24 normally flexed upwardly by pressure in the piping 16 and 16A and thereby normally holds a switch member 25 open with respect to a contact terminal 26. The switch member 25 and the contact 26 are so arranged that when the pressure in the reservoir 17 and the piping 16 and 16A is reduced, the switch member 25 will seat upon the contact member 26 and close an electric circuit through a pair of wires 27 and 27A. Also connected into the piping 16 between the valve actuating portions 12 and 13 and the piping 16A, there is a pneumatically operated pilot valve 28. It is connected by means of a section of pipe 16B.

Figure 2:
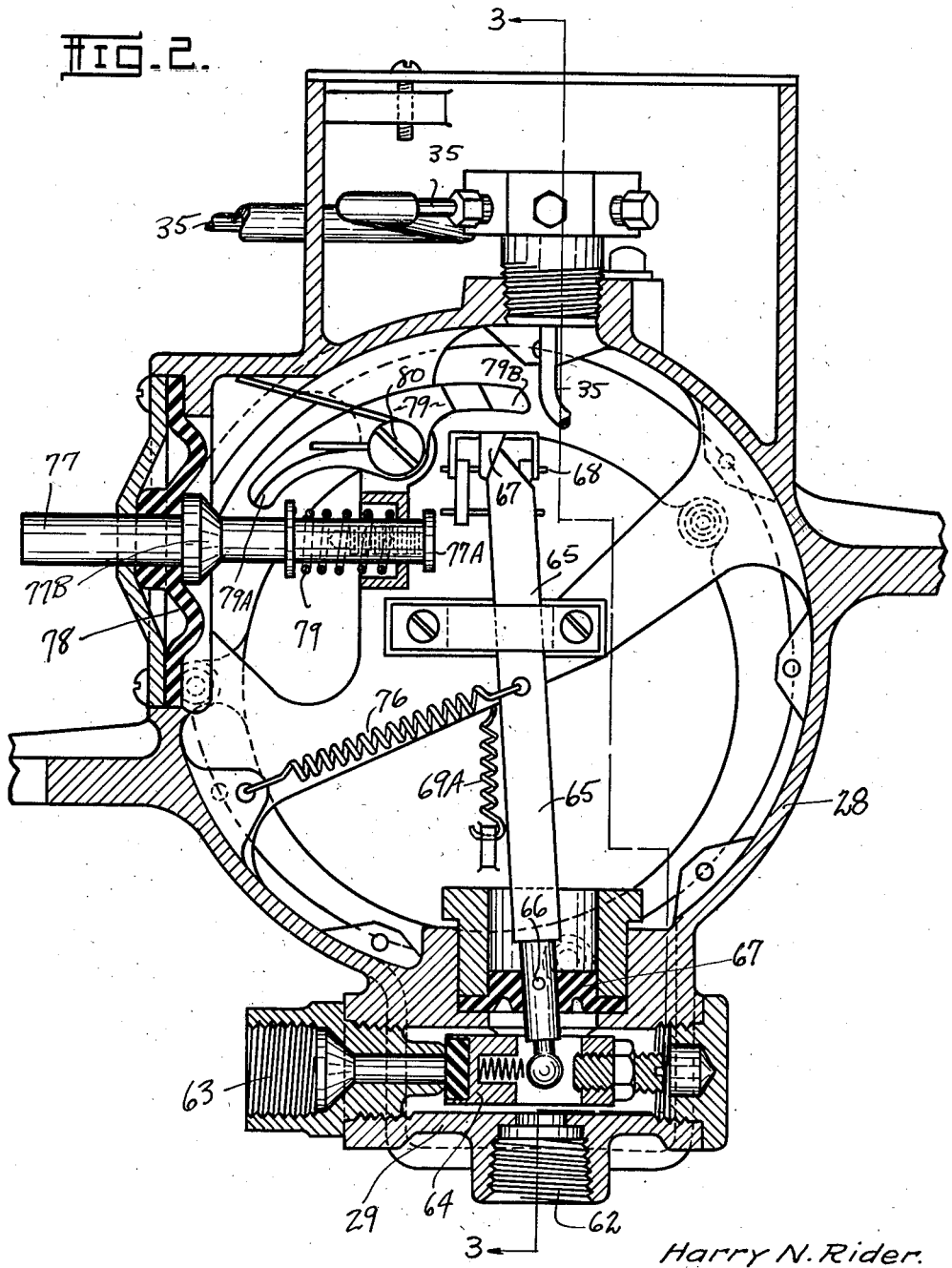
Figure 2 is an enlarged cross sectional plan view of a portion of the pneumatically actuated valve controlling apparatus illustrated in Figure 1.
Figure 3:
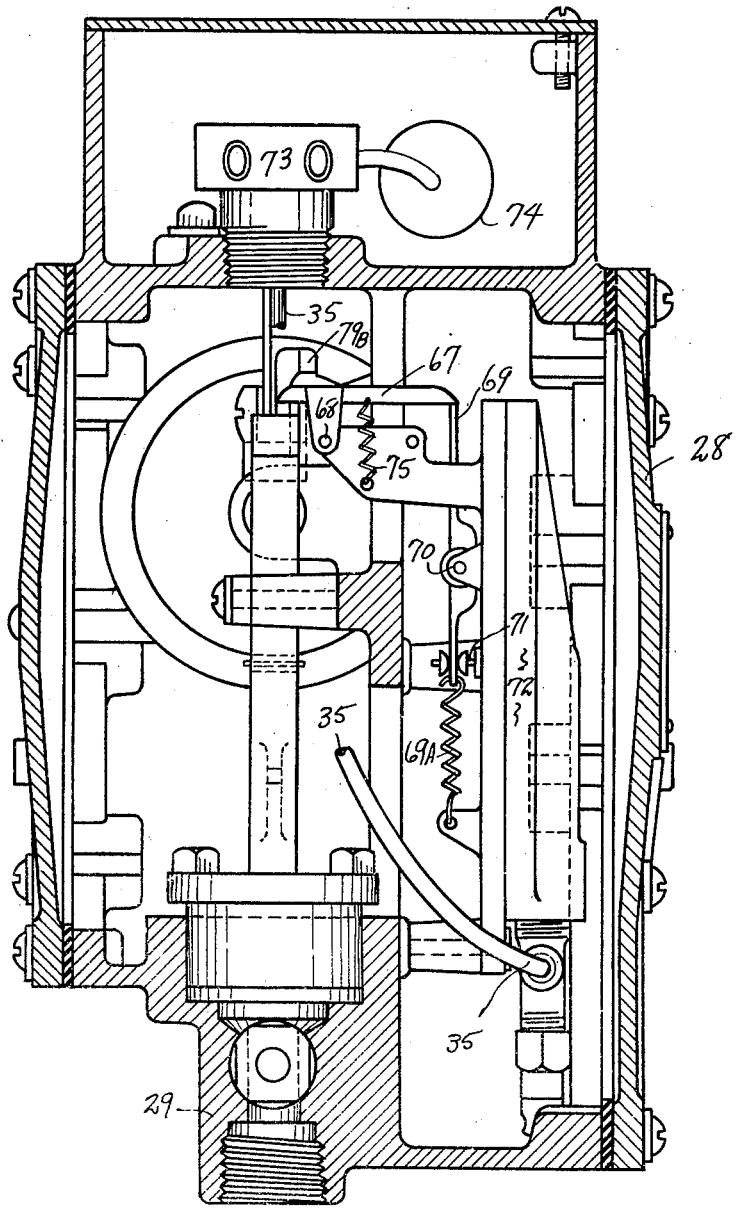
Figure 3 is an enlarged cross sectional side elevation of a portion of the apparatus shown in Figure 1 and taken on line 3—3 of Figure 2.

The pilot valve 28, as is illustrated in enlarged detail in Figures 2 and 3 of the drawings, includes a normally closed fluid valve 29 which controls a communication channel between the piping 16B and piping 16C which in turn communicates with a secondary reservoir 30. The secondary reservoir 30 is provided with a vent 31 and a gauge stick 32 and is connected with the pump 18 by means of piping 16D. A check valve 33 in the piping 16D between the pump 18 and the secondary reservoir 30 permits fluid from the secondary reservoir 30 to flow freely to the pump 18 but prevents flow in the opposite direction.

It will thus be seen that when the pump 18 is operated, fluid is moved from the secondary reservoir 30 into the piping 16, through the check valve 21, the control valve 20, into the reservoir 17 and through the restriction 19 and the piping 16 into the actuating portions 12 and 13 of the fluid control valves 10 and 11. When suitable pressure is built up in the reservoir 17 by the pump 18, the pressure will serve to hold the actuating portions 12 and 13 of the fluid control valves 10 and 11 in open position and thereby permit the free flow of fluid through the fluid lines 14 and 15. In order that the flow of material through the fluid lines 14 and 15 can be stopped at such time as a fire breaks out in apparatus such as loading racks which may be in communication with the fluid lines 14 and 15, a heat actuated device comprising a pneumatic thermostat 34 is positioned adjacent the fire area and is connected by means of air tubing 35 with the pneumatically operated pilot valve 28, the mechanism of which controls the fluid valve 29 thereof.

Fire occuring in the area supervised by the pneumatic thermostat 34 will result in an increase of air pressure confined within the thermostat 34 and the air tubing 35. The increased pressure will be conveyed by the air tubing 35 to the mechanism of the pneumatically operated pilot valve 28 where it will cause the opening of the fluid valve 29 thereof and thereby permit the fluid pressure in the reservoir 17, the piping 16 and 16B and the actuating portions 12 and 13 of the fluid control valves 10 and 11 to be vented by way of the piping 16C into the secondary reservoir 30. When this occurs, the construction of the Atwood-Morrell type valves 10 and 11 causes the clappers thereof to close and thereby prevent further flow of material through the fluid lines 14 and 15 on which these control valves 10 and 11 are installed. It will be obvious to those skilled in the art that the opposite action may be obtained and that the Atwood-Morrell type valves are available for opening pipe lines upon loss of pressure from their actuating mechanism. In Figure 1 of the drawings the section of piping 16 is shown in the manner of a manifold for the connection of additional fluid control valves such as 10 and 11.

It will be obvious to those skilled in the art that means for manually initiating the operation of the apparatus so far described is desirable. In Figure 1 means for such operation is provided and consists of a cylinder 36 including a piston 37 having a manually engageable handle 38 affixed thereto. Air tubing 35A connects the cylinder 36 with the air tubing 35 so that at such time as the piston 37 is moved as by the manual actuation of the handle 38, resulting compression of air in the cylinder 36 will be transmitted through the air tubing 35A and the air tubing 35 to the pneumatically operated pilot valve 28 and thereby cause the operation of the same and the opening of the fluid valve 29 thereof. As has heretofore been explained, when this occurs, the pressure is vented by way of the piping 16C to the secondary reservoir 30 and the fluid control valves 10 and 11 are closed.

In the apparatus disclosed in Figure 1 of the drawings, means is also provided for initiating an alarm upon the actuation of the system, as heretofore described, by either automatic pneumatic thermostat operation or manual operation. Such means includes a pressure sensitive switch 39 having a diaphragm 40 therein, the diaphragm 40 forming one wall of a chamber 41 which is in communication by means of a section of air tubing 35B with the air tubing 35A and hence the pneumatic thermostat 34 and the cylinder 36. At such time as an increase in pressure occurs in the air tubing 35, the diaphragm 40 will be flexed sufficiently to close the circuit between contacts 42 and 43 in the pressure sensitive switch 39 and thereby closes a circuit between a pair of wires 44 and 44A.

As disclosed in Figure 1 of the drawings, certain electrical circuits and electrically operated alarms are employed in connection with the pneumatically actuated valve controlling apparatus. The circuits and the alarm devices are illustrated and comprise an operating power source, for example, 6 volts, indicated by the wires 45 and 45A. The pair of wires 27 and 27A, which are controlled by the pressure sensitive switch 23, connect with these wires 45 and 45A to complete a circuit between the wires 45 and 45A and a bell 46. This is at such time as the pressure in the reservoir 17 and the piping 16 drops and needs to be replaced. The pressure sensitive switch 23 will close the electrical circuit through the bell 46 and give an alarm. At such time as the system operates by reason of a fire or the manual control thereof, the pressure sensitive switch 39 will close a circuit between the wires 44 and 44A which connect the wires 45 and 45A with a solenoid 47. The solenoid 47 includes a solenoid operated electric switch 48 which controls an electrical circuit between a wire 49 and one or the other of a pair of wires 50 and 51. This three-wire circuit, as defined by the wires 49, 50 and 51, connect with a central station alarm box generally indicated by the numeral 52. A multiple switch 53 is also connected with the wires 44A and 45A by means of lead wires 54 and 54A so that when the pressure sensitive switch 39 is closed, the multiple switch 53 is energized and a plurality of circuits closed by a plurality of solenoid operated switches therein. One of these switches is indicated by the numeral 55 and establishes a circuit between the wire 54A and hence the wire 45A with the wire 56 and a siren 57. The siren 57 is also connected with the wire 45. The other two switches, indicated by the numerals 58 and 59, respectively, control pairs of wires 60 and 61, respectively, which may be used in stopping or starting an electric motor or the like used in pumping the material flowing through the fluid lines 14 and 15.

It will thus be seen that when fire causes the air in the pneumatic thermostat 34 to expand, the valves 10 and 11 are closed by the action of the apparatus heretofore described and at the same time the siren 57 is energized, the pairs of wires 60 and 61 are connected in electrical circuit or the circuits broken, as desired, by reason of the actuation of the multiple solenoid switch and the solenoid switch 47 initiates a central station signal.

As the entire operation of the pneumatically actuated valve controlling apparatus is dependent upon the operation of the pneumatically actuated pilot valve 28, enlarged detail illustrations of the same may be seen by referring to Figures 2 and 3 of the drawings. In Figures 2 and 3 of the drawings, the housing of the pilot valve is generally indicated by the numeral 28 and the fluid valve portion thereof is indicated by the numeral 29. It will be observed in Figure 2 of the drawings that the valve 29 includes an inlet orifice 62 and an outlet orifice 63. The inlet orifice 62 and the outlet orifice 63 are connected with the pipes 16B and 16C, respectively. The valve 29 includes a valve element 64 normally closing the outlet orifice 63. The valve element 64 is controlled by an operating arm 65 which is pivoted at a point 66. A gasket 67 closes the area about the operating arm 65 and the pivot 66. It will be observed that the lowermost end of the arm 65 is positioned in operative relation within an opening in the valve element 64 so that the same may be moved back and forth when the arm 65 is pivoted on the pivot 66.

In normally closed position, as illustrated in Figure 2, the arm 65 holds the valve element 64 in closed position on the outlet orifice 63. The arm 65 is held in this position by means of a depending portion of a detent 67 which in turn is pivoted within the housing 28 by means of a pivot pin 68 (see Figure 3). The opposite end of the detent 67 is supported by the uppermost end of a lever 69 which in turn is pivoted by a pivot 70 to a portion of the housing 28. The lowermost end of the lever 69 is positioned adjacent an operating pin 71 which is positioned in an opening in a diaphragm case 72 which forms a portion of the mechanism within the housing 28 and positions a diaphragm across an air chamber so that it may be flexed in the direction of the pin 71 so as to move the same by air pressure introduced into the diaphragm case 72 by means of the air tubing 35. The air tubing 35 extends upwardly through the interior of the housing 28 and passes outwardly thereof through a bushing 73 and thence outwardly of the housing by way of an opening 74, as best shown in Figure 2 of the drawings.

By referring again to Figure 3 of the drawings, it will be seen that the detent 67 is normally biased by a spring 75 to insure the depending finger portion thereof, normally engaging the uppermost end of the arm 65, moving upwardly so as to release the arm 65. When the arm 65 is thus released, a coil spring 76 moves the arm 65 to the left as shown in Figure 2 of the drawings, thereby imparting motion to the valve element 64 to open communication between the inlet orifice 62 and the outlet orifice 63 of the fluid valve 29.

In order that the mechanism can be reset for subsequent operation, a reset lever 77 is positioned through an opening in a section of the housing 28 and is suitably sealed with respect to the interior of the housing 28 as by means of a resilient gasket 78 and is normally urged outwardly of the housing 28 by means of a coil spring 79. The innermost end 77A of the reset lever is in line with the arm 65. When the arm 65 is moved by the spring 76 to open the valve element 64, it will rest against the end 77A of the reset lever 77. When the reset lever 77 is moved inwardly, toward the right in Figure 2, it will move the arm 65 back into the position illustrated in Figure 2. At the same time it will cause a tilting member 79, which is pivoted to the housing 28 by means of a screw 80, to operate as follows. An end 79A will engage a cone-shaped collar 77B on the reset lever 77 which will elevate the end 79A of the tilting member 79 and cause the opposite end 79B to move downwardly into engagement with the detent 67 and thereby move it into the position illustrated in Figure 2, and simultaneously permit the lever 69 to move in under the opposite end of the detent 67 and thereby normally support the same in set position. The lever 69 is moved by means of a coil spring 69A. When this operation has taken place, the device is reset and is ready for subsequent operation either as initiated by the pneumatic thermostat 34 or the manual actuating cylinder 36.

Figure 4:
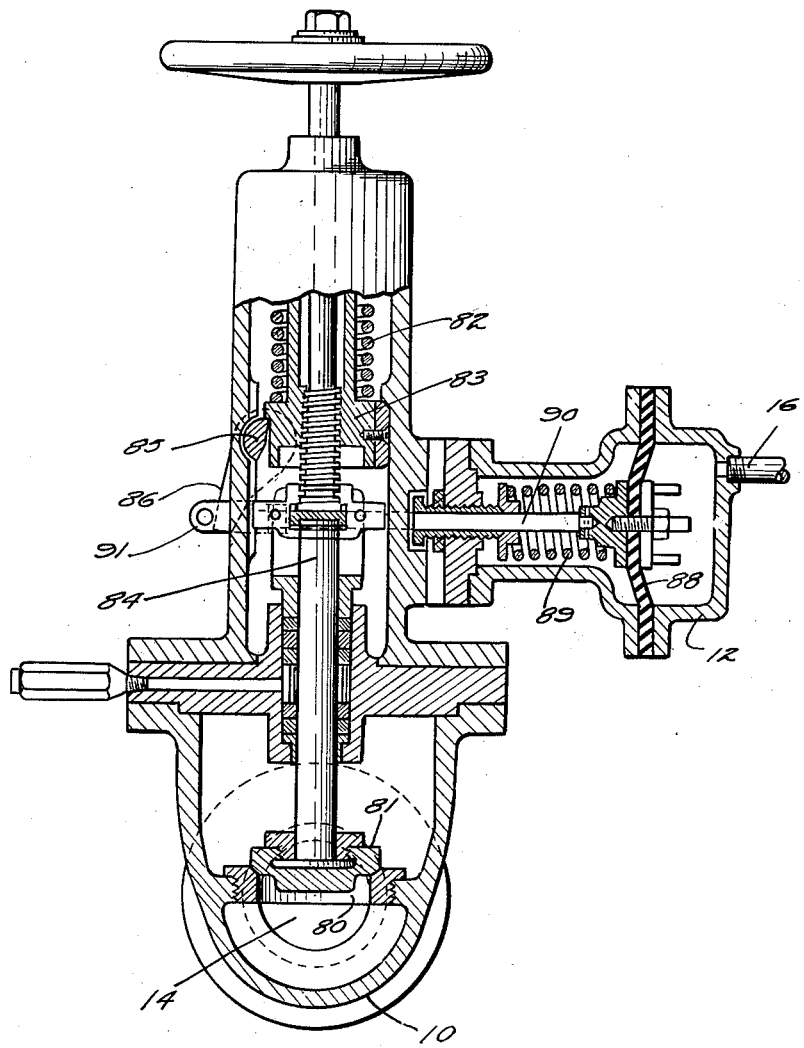
Figure 4 is an enlarged cross sectional plan view of one of the fluid control valves illustrated in Figure 1.

By referring now to Figure 4 of the drawings an enlarged cross sectional plan view of one of the fluid control valves illustrated in Figure 1 of the drawings and heretofore referred to as being of the Atwood-Morrell type may be seen. In Figure 4 of the drawings the valve body is indicated by the numeral 10 and piping 14 connected therewith forms the fluid pasageway therethrough for the material controlled thereby. The valve body 10 includes a partition having an orifice 80 therein adapted to be closed by a clapper 81. The clapper 81 is normally biased to closed position by a spring 82 engaging a shoulder 83 on an arm 84 connected to the clapper 81. A rotatable latch 85 operated by a sidewardly projecting arm 86 normally engages the shoulder 83 and thereby holds the spring 82 in compressed position as shown and the clapper 81 in open position with respect to the orifice 80. The rotatable latch 85 is controlled by a hydraullic cylinder and piston assembly, the cylinder being indicated by the numeral 12 and the piston being of the diaphragm type and indicated by the numeral 88.

A coil spring 89 normally biases the diaphragm type piston toward the cylinder 12 and a connecting rod 90 connected to the diaphragm type piston is pivotally connected as at 91 to the arm 86 controlling the rotatable latch 85. Fluid pressure introduced into the cylinder 12 by way of the pipe 16, as also shown in Figure 1 of the drawings, serves to hold the diaphragm type piston 88 downwardly and hence results in holding the rotatable latch 85 in latched position with respect to the shoulder 83 and thereby holds the clapper 81 in open position. Venting of the hydraulic pressure in communication with the line 16, as heretofore described, permits the spring 89 to move the connecting rod 90 upwardly and hence move the arm 86 of the rotatable latch 85 thereby permitting the spring 82 to move the rod 84 and close the clapper 81.

In connection with the description of this valve it will occur to those skilled in the art that the invention disclosed herein is not limited to a valve controlling apparatus incorporating the specific type of fluid control valve disclosed in Figure 4 of the drawings as other similar hydraulically controlled fluid controlling valves are known in the art and capable of being used in the pneumatically actuated valve controlling apparatus herein set forth.

It will thus be seen that a pneumatically actuated valve controlling apparatus has been disclosed which will efficiently operate automatically at the time of fire to open or close fluid control valves 10 and 11 on the fluid lines 14 and 15. It will be obvious to those skilled in the art that the apparatus possesses several advantages not heretofore found in automatic valves. Primary among these is the pneumatic actuating system which may be extended into a hazardous area with no danger whatsoever of its causing sparks or fire. The actual valve controlling apparatus is entirely pneumatic in operation and the electrical connections to the apparatus, when desired, may be located remotely of the fire area. In handling petroleum and the various products thereof, it is desirable to eliminate the possibility of fire and the present invention accomplishes this object by relying on the extension of the pneumatic thermostat and air tubing into the fire zone for detecting fire and extending the pressure line into the fire zone for effecting the actual control of the main fluid valves.

It will thus be seen that the invention is advantageously practiced in connection with the control of fluid lines, particularly in fire hazard areas.

Having thus described my invention, what I claim is:

1. A flow line valve and controlling apparatus therefor and comprising in combination a fluid control valve having a clapper therein and a hydraulic piston and cylinder assembly thereon, the said piston operatively connected to said clapper and a source of fluid pressure in communication with said hydraulic cylinder normally holding said piston and clapper in open position, means for venting the said fluid pressure to permit the said piston and clapper to move to closed position, said venting means comprising a pressure responsive release mechanism including a fluid relief valve in communication with said fluid pressure supply, pneumatically actuated means for effecting movement of the said fluid relief valve and a pneumatic thermostat in a fire zone in communication with said pneumatically actuated means for actuating the same.

2. A flow line valve and controlling apparatus therefor and comprising in combination a fluid control valve having a clapper therein and spring means normally biasing said clapper toward closed position, a hydraulic piston and cylinder assembly on said fluid control valve, the said piston operatively connected to said clapper, a source of fluid pressure in communication with said hydraulic cylinder normally holding said piston and clapper in open position, a by-pass for returning said fluid pressure to said fluid pressure source to permit the said piston and clapper to be moved to closed position by said spring means, a secondary fluid control valve in said by-pass, pneumatically actuated means for effecting the movement of the said secondary fluid control valve and a pneumatic thermostat in a fire zone in communication with said pneumatically actuated means for actuating the same.

HARRY N. RIDER.

REFERENCES CITED

The following references are of record in the file of this patent:

UNITED STATES PATENTS

| Number | Name | Date |
|---|---|---|
| 1,613,343 | Clark | Jan. 4, 1927 |
| 1,773,272 | Loepsinger | Aug. 19, 1930 |
| 1,843,688 | Lowe | Feb. 2, 1932 |
| 1,909,490 | Griffith | May 16, 1933 |
| 2,196,592 | Lowe | Apr. 9, 1940 |
| 2,298,062 | Lewis | Oct. 6, 1942 |
| 2,349,464 | Rider | May 23, 1944 |
| 2,421,303 | Houten | May 27, 1947 |